(12) United States Patent
Ota et al.

(10) Patent No.: US 11,796,482 B2
(45) Date of Patent: Oct. 24, 2023

(54) DISPLAY CONTROL DEVICE AND STORAGE MEDIUM

(71) Applicant: SINTOKOGIO, LTD., Nagoya (JP)

(72) Inventors: Kazuhiro Ota, Toyokawa (JP); Takeshi Sonohara, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 315 days.

(21) Appl. No.: 17/213,381

(22) Filed: Mar. 26, 2021

(65) Prior Publication Data

US 2021/0302323 A1 Sep. 30, 2021

(30) Foreign Application Priority Data

Mar. 30, 2020 (JP) ................ 2020-061043

(51) Int. Cl.
*G01N 21/88* (2006.01)
*G01N 21/95* (2006.01)
(Continued)

(52) U.S. Cl.
CPC ......... *G01N 21/8806* (2013.01); *B22C 23/00* (2013.01); *G01N 21/9515* (2013.01); *B22C 9/02* (2013.01); *H04N 9/3161* (2013.01)

(58) Field of Classification Search
CPC .. B22C 9/04; B22C 1/00; B22C 1/181; B22C 9/02; B22C 9/22; B22C 3/00; B22C 1/02; B22C 9/12; B22C 1/06; B22C 7/02; B22C 9/10; B22C 19/04; B22C 25/00; B22C 21/14; B22C 23/00; B22C 9/00; B22C 9/043; B22C 9/24; B22C 9/046; B22C 1/16; B22C 1/18; B22C 9/108; B22C 1/167; B22C 1/2273; B22C 11/10; B22C 15/24; B22C 9/067; B22C 9/28; B22C 13/00; B22C 19/00; B22C 23/02; B22C 5/00; B22C 5/0413; B22C 5/06; B22C 5/08;
(Continued)

(56) References Cited

U.S. PATENT DOCUMENTS 4,409,718 A * 10/1983 Pryor .................. B22D 46/00
901/44
5,075,051 A 12/1991 Ito et al.
(Continued)

FOREIGN PATENT DOCUMENTS

CN 105452806 A * 3/2016 .............. G01C 1/04
CN 111161224 A 5/2020
(Continued)

OTHER PUBLICATIONS

Japanese Office Action and English translation thereof for JP2020-061041 dated Feb. 7, 2023.
(Continued)

*Primary Examiner* — Michael P Stafira
(74) *Attorney, Agent, or Firm* — Harness, Dickey & Pierce, P.L.C.

(57) ABSTRACT

Provided is the technique that allows an operator or the like to easily grasp in which part of a mold a defect has been detected. A display control device is configured to carry out a display process in which a marker indicating a defect of a mold determined by an inspection result, which is obtained by an inspection of molds, is optically displayed on the mold.

8 Claims, 12 Drawing Sheets

(51) Int. Cl.
   *B22C 23/00*    (2006.01)
   *B22C 9/02*     (2006.01)
   *H04N 9/31*     (2006.01)

(58) Field of Classification Search
   CPC .. B22C 5/085; B22C 5/16; B22C 7/06; B22C 9/06; B22C 9/061; B22C 9/08; B22C 9/082; B22C 9/084; B22C 9/088; B22C 9/103; G01N 21/9045; G01N 21/90; G01N 21/958; G01N 21/8851; G01N 21/9054; G01N 21/8806; G01N 2021/8887; G01N 21/88; G01N 23/20; G01N 21/956; G01N 21/9036; G01N 2021/888; G01N 21/9515; G01N 21/95; G01N 29/048; G01N 29/2412; G01N 29/4445; G01N 2021/3181; G01N 21/1717; G01N 21/952; G01N 2223/627; G01N 2291/0234; G01N 27/90; G01N 27/9006; G01N 27/904; G01N 33/386; G01N 2021/9583; G01N 21/93; G01N 29/041; G01N 29/0654; G01N 29/262; G01N 19/08; G01N 2021/8822; G01N 2021/8854; G01N 2021/8874; G01N 21/9081; G01N 21/954; G01N 21/95607; G01N 23/046; G01N 29/265; G01N 2021/0112; G01N 2021/0143; G01N 21/01; G01N 21/8803; G01N 21/909; G01N 2201/0635; G01N 2201/12; G01N 25/72; G01N 27/84; G01N 29/04; G01N 29/11; G01N 3/08; G01N 15/0606; G01N 15/0826; G01N 2021/0181; G01N 2021/845; G01N 2021/8829; G01N 2021/8861; G01N 2021/8877; G01N 2021/8883; G01N 2021/8893; G01N 2021/9511; G01N 21/89; G01N 21/9009; G01N 21/9018; G01N 21/91; G01N 2201/0626; G01N 2201/1296; G01N 2203/0017; G01N 2203/0078; G01N 2203/0082; G01N 2203/0647; G01N 23/04; G01N 23/18; G01N 27/624; G01N 29/043; G01N 29/0636; G01N 29/07; G01N 29/24; G01N 29/2418; G01N 29/2443; G01N 29/2468; G01N 3/02; G01N 3/28; G01N 3/42; G01N 33/20; G01N 1/04; G01N 1/28; G01N 1/286; G01N 15/10; G01N 2021/8825; G01N 2021/889; G01N 2021/8896; G01N 2021/95615; G01N 21/59; G01N 21/6447; G01N 21/6452; G01N 21/896; G01N 21/8986; G01N 21/9501; G01N 21/9506; G01N 2203/0026; G01N 2203/028; G01N 2223/04; G01N 2223/07; G01N 2223/102; G01N 2223/30; G01N 2223/303; G01N 2223/323; G01N 2223/40; G01N 2291/0427; G01N 2291/048; G01N 2291/2626; G01N 23/083; G01N 23/207; G01N 23/2251; G01N 2333/01; G01N 2333/21; G01N 2333/245; G01N 2333/31; G01N 2333/38; G01N 2333/40; G01N 2333/705; G01N 2333/974; G01N 2560/00; G01N 2800/2814; G01N 2800/2828; G01N 29/0609; G01N 29/22; G01N 29/223; G01N 29/2456; G01N 29/27; G01N 29/28; G01N 3/00; G01N 3/20; G01N 33/2045; G01N 33/46; G01N 33/48; G01N 33/558; G01N 33/56966; G01N 33/56983; G01N 33/6854; G01N 33/6896; G01N 35/08; G01N 5/02; G01N 9/00; G01N 9/36; G01N 2021/8809; G01N 33/442; G01N 2021/9513; G01N 23/203; G01N 29/06; G02B 1/043; G02B 1/041; G02B 1/04; G02B 5/23; G02B 1/118; G02B 1/18; G02B 2207/109; G02B 3/00; G02B 1/111; G02B 3/04; G02B 5/30; G02B 6/0065; G02B 13/001; G02B 13/0045; G02B 13/0065; G02B 13/0085; G02B 2003/0093; G02B 27/017; G02B 3/0062; G02B 5/003; G02B 5/005; G02B 6/0021; G02B 6/0031; G02B 6/0051; G02B 6/0055; G02B 6/006; G02B 6/0091; G02B 6/0093; G02B 7/026; G02B 1/116; G02B 1/14; G02B 5/3016; G02B 5/3033; G02B 5/3083; G02B 6/0001; G02B 6/0038; G02B 6/0046; G02B 6/0061; G02B 6/02152; G02B 6/02185; G02B 6/241; G02B 6/245; G02B 6/322; G02B 6/3624; G02B 6/3636; B22D 21/005; B22D 21/022; B22D 46/00; B22D 11/16; B22D 47/02; B22D 11/20; B22D 17/32; B22D 11/055; B22D 21/06; B22D 25/02; B22D 11/00; B22D 27/045; B22D 11/0401; B22D 11/07; B22D 19/10; B22D 11/059; B22D 11/115; B22D 31/005; B22D 41/00; B22D 11/003; B22D 11/04; B22D 11/10; B22D 11/108; B22D 11/128; B22D 11/202; B22D 41/50; B22D 11/051; B22D 11/14; B22D 11/045; B22D 11/143; B22D 11/163; B22D 11/182; B22D 17/00; B22D 45/00; B22D 11/0622; B22D 11/064; B22D 11/126; B22D 11/18; B22D 2/00; B22D 21/02; B22D 11/041; B22D 11/057; B22D 11/12; B22D 11/1282; B22D 11/208; B22D 11/22; B22D 17/20; B22D 17/2076; B22D 17/2084; B22D 17/2245; B22D 18/04; B22D 2/006; B22D 21/007; B22D 27/00; B22D 47/00; B22D 11/001; B22D 11/0628; B22D 11/111; B22D 11/1206; B22D 11/124; B22D 11/147; B22D 11/166; B22D 11/185; B22D 11/186; B22D 13/00; B22D 17/2236; B22D 17/2254; B22D 21/04; B22D 27/15; B22D 31/00; G01B 11/24; G01B 21/04; G01B 21/20; G01B 11/27; G01B 11/2513; G01B 11/245; G01B 11/00; G01B 11/03; G01B 11/25; G01B 11/26; G01B 11/002; G01B 11/06; G01B 11/0691; G01B 11/165; G01B 11/2518; G01B 11/254; G01B 11/30; G01B 17/02; G01B 21/085; G01B 5/14; G01B 7/02; G01B 7/30
   See application file for complete search history.

(56) References Cited

U.S. PATENT DOCUMENTS 6,615,159 B1   9/2003   Nishida
6,661,507 B2   12/2003  Yoda et al.

(56) References Cited

U.S. PATENT DOCUMENTS

| | | | |
|---|---|---|---|
| 2005/0225753 A1* | 10/2005 | Engelbart | G05B 19/418 |
| | | | 356/237.1 |
| 2014/0336806 A1* | 11/2014 | Bewlay | G06F 30/00 |
| | | | 700/98 |
| 2016/0041092 A1 | 2/2016 | Urano et al. | |
| 2016/0346979 A1 | 12/2016 | Uchiyama | |
| 2017/0014945 A1* | 1/2017 | Fraser | B23K 26/359 |
| 2017/0165891 A1 | 6/2017 | Shiraishi | |
| 2018/0207716 A1 | 7/2018 | Larsen et al. | |
| 2019/0258225 A1 | 8/2019 | Link et al. | |
| 2019/0385116 A1 | 12/2019 | Vosshenrich | |
| 2020/0234419 A1 | 7/2020 | Ota et al. | |
| 2021/0001399 A1 | 1/2021 | Bullied et al. | |

FOREIGN PATENT DOCUMENTS

| | | | |
|---|---|---|---|
| CN | 111929309 A * | 11/2020 | |
| DE | 19542640 A1 * | 5/1996 | B22D 47/02 |
| DE | 102006009320 A1 * | 9/2007 | B22D 46/00 |
| DE | 202019004266 U1 * | 12/2019 | |
| EP | 3315281 A1 | 5/2018 | |
| EP | 3632650 A1 | 4/2020 | |
| EP | 3736064 A1 * | 11/2020 | B22C 19/04 |
| JP | H05169244 A | 7/1993 | |
| JP | 9-311031 | 12/1997 | |
| JP | 2000-131242 A | 5/2000 | |
| JP | 2004-144556 A | 5/2004 | |
| JP | 2004/198436 A | 7/2004 | |
| JP | 2004-334631 A | 11/2004 | |
| JP | 2007-532910 A | 11/2007 | |
| JP | 2010-139461 A | 6/2010 | |
| JP | 2010-223810 A | 10/2010 | |
| JP | 2012-045563 A | 3/2012 | |
| JP | 2013-43185 A | 3/2013 | |
| JP | 2017105117 A * | 6/2017 | B29C 45/1769 |
| JP | 2018-040767 A | 3/2018 | |
| JP | 2018/075830 A | 5/2018 | |
| JP | 2018-520009 A | 7/2018 | |
| JP | 2019-148497 A | 9/2019 | |
| JP | 2019196964 A * | 11/2019 | G01J 3/02 |
| JP | 2019-215932 A | 12/2019 | |
| JP | 2019-217506 A | 12/2019 | |
| JP | 2020-508275 A | 3/2020 | |
| KR | 100933697 B1 * | 12/2009 | |
| KR | 20100124653 A * | 11/2010 | |
| KR | 102090103 B1 * | 3/2020 | |
| WO | WO-2017/085765 A1 | 5/2017 | |
| WO | WO-2017085765 A1 * | 5/2017 | B22D 46/00 |
| WO | WO-2018/216495 A1 | 11/2018 | |
| WO | WO-2018216495 A1 * | 11/2018 | B22C 19/04 |
| WO | WO-2020003888 A1 * | 1/2020 | |

OTHER PUBLICATIONS

Japanese Office Action and English translation thereof for JP2020-061043 dated Feb. 7, 2023.
U.S. Office Action for corresponding U.S. Appl. No. 17/213,383 dated Feb. 2, 2023.
U.S. Office Action for corresponding U.S. Appl. No. 17/213,383 dated Sep. 1, 2022.
Japanese Office Action and English translation thereof for Japanese Application No. 2020-061043 dated Jul. 4, 2023.
U.S. Office Action for corresponding U.S. Appl. No. 17/213,361 dated Apr. 12, 2023.
U.S. Office Action for corresponding U.S. Appl. No. 17/213,377 dated May 11, 2023.
Japanese Office Action and English machine translation thereof for Japanese Application No. 2020-061041 dated May 9, 2023.

* cited by examiner

| Pattern code | Reference image folder No. |
|---|---|
| ... | ... |
| 10 | S10 |
| 11 | S11 |
| ... | ... |
| ... | ... |

| Mold ID | Pattern code | Date and time of inspection | Inspection result | |
|---|---|---|---|---|
| | | | Evaluation | Inspection result image folder No. |
| 1001 | 10 | 2019.12.01 10:30:00 | Good | K1 |
| 1002 | 11 | 2019.12.01 10:30:30 | Good | K2 |
| 1003 | 10 | 2019.12.01 10:31:00 | Good | K3 |
| 1004 | 11 | 2019.12.01 10:31:30 | No good | K4 |
| ... | ... | ... | ... | ... |
| ... | ... | ... | ... | ... |

FIG. 7

| Mold ID | Pattern code | Position | Mold inspection result | | ... |
| | | | Evaluation | Pouring permission/non-permission | |
|---|---|---|---|---|---|
| 1001 | 10 | P19 | Good | Permission | ... |
| 1002 | 11 | P18 | Good | Permission | ... |
| 1003 | 10 | P17 | Good | Permission | ... |
| 1004 | 11 | P16 | No good | Non-permission | ... |
| ... | ... | ... | ... | ... | ... |
| ... | ... | ... | ... | ... | ... |

DISPLAY CONTROL DEVICE AND STORAGE MEDIUM

This Nonprovisional application claims priority under U.S.C. § 119 on Patent Application No. 2020-061043 filed in Japan on Mar. 30, 2020, the entire contents of which are hereby incorporated by reference.

TECHNICAL FIELD

The present invention relates to a display control device and a storage medium.

BACKGROUND ART

In casting, the technique of inspecting molds for failures has been proposed. For example, Patent Literature 1 discloses detecting the width of a possible gap between adjacent sand mold parts, mold expansion, and mold dimensions to assess whether or not an actual situation is acceptable. Patent Literature 1 also proposes the technique of inspecting produced castings for failures. Patent Literature 2 discloses that an abnormal ingot position of an ingot is calculated based on information on molten metal to be solidified in a mold, and the abnormal ingot position is communicated to a subsequent continuous step. Patent Literature 3 discloses that images related to the name of a mold during casting, which is the pre-processing step, and to the name and shape of a mold during shakeout are displayed by a display means installed in the post-processing step in which sprue separation or the other process is carried out.

CITATION LIST

Patent Literature

[Patent Literature 1]
Published Japanese Translation of PCT International Application, Tokuhyo, No. 2018-520009
[Patent Literature 2]
Japanese Patent Application Publication, Tokukai, No. 2013-43185
[Patent Literature 3]
Japanese Patent Application Publication, Tokukaihei, No. 05-169244

SUMMARY OF INVENTION

Technical Problem

The techniques disclosed in Patent Literatures 1 to 3, in some cases, make it impossible for the operator to easily grasp in which part of a mold a failure has occurred. For example, in a case where a detected mold drop part of the mold is small, an image showing the detected mold drop is small correspondingly. In this case, the operator cannot grasp, at a glance, in which part there is a mold drop.

It is an object of an aspect of the present invention to provide the technique which allows an operator or the like to easily grasp in which part of a mold a defect has been detected.

Solution to Problem

In order to solve the above-described problem, a display control device in accordance with an aspect of the present invention includes a controller, and the controller is configured to carry out a display process in which a marker indicating a defect of a mold determined by an inspection result, which is obtained by an inspection of molds, is optically displayed on the mold.

Further, in order to solve the above-described problem, a computer-readable non-transitory storage medium in accordance with an aspect of the present invention stores a control program for controlling the display control device described in the above-described aspect, the control program causing the controller to carry out each of the foregoing processes.

Advantageous Effects of Invention

An aspect of the present invention allows an operator or the like to easily grasp in which part of a mold a defect has been detected.

BRIEF DESCRIPTION OF DRAWINGS

FIG. 7 is a diagram illustrating an example of contents of a mold management table in accordance with Embodiment 1 of the present invention.

DESCRIPTION OF EMBODIMENTS

Embodiment 1

Figure 1:
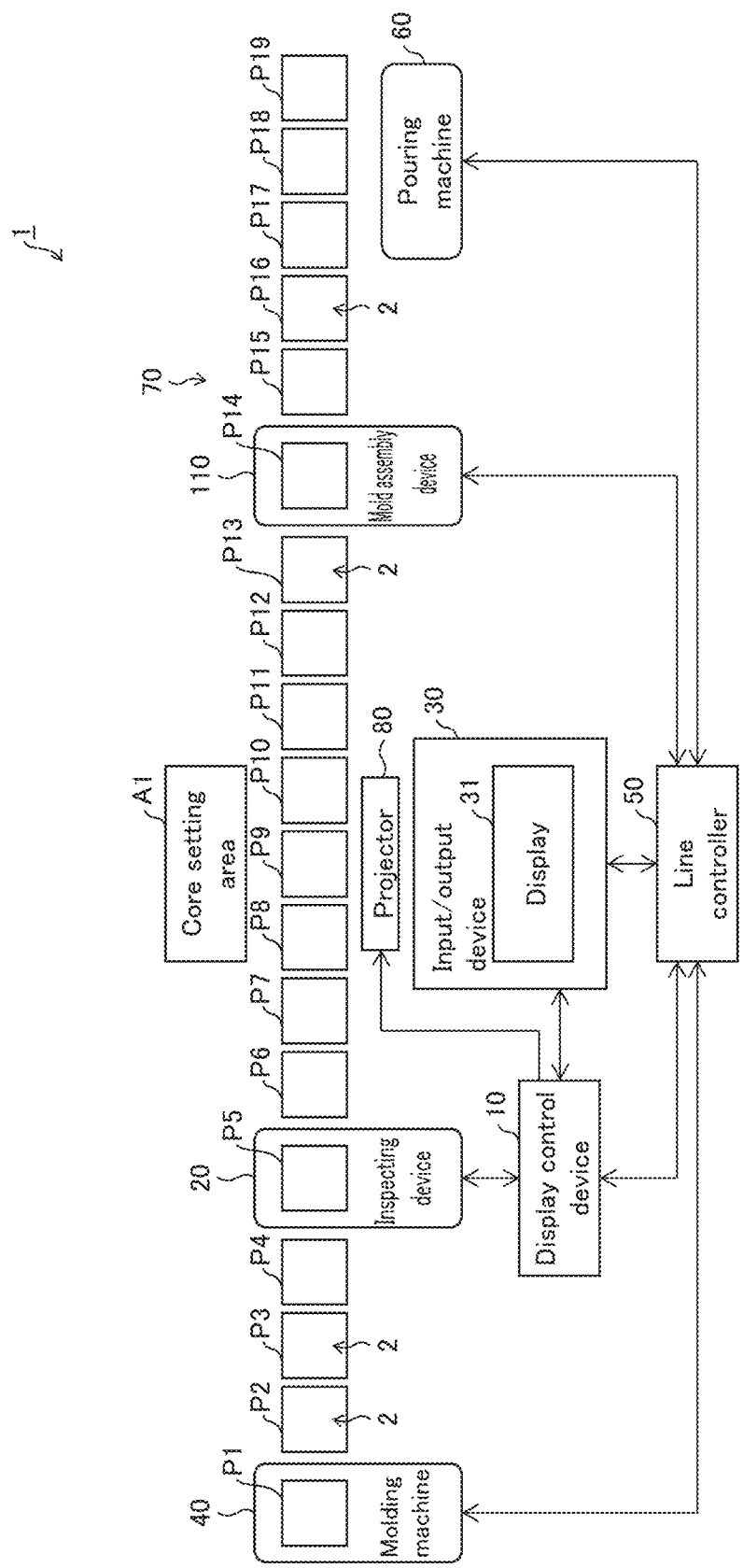
FIG. 1 is a diagram schematically illustrating a configuration of a casting system in accordance with Embodiment 1 of the present invention.

FIG. 1 is a diagram schematically illustrating a configuration of a casting system 1 that includes a display control device in accordance with an embodiment of the present invention. The casting system 1 is a system that produces castings by pouring molten metal into a plurality of molds 2 conveyed along a conveyance path. The casting system 1 includes a display control device 10, an inspecting device 20, an input/output device 30, a molding machine 40, a line controller 50, a pouring machine 60, a conveying device 70, a mold assembly device 110, and a projector 80.

The display control device 10 is a device that displays, on a display 31, an inspection result obtained by inspecting the molds 2 for failures during casting and optically displays the inspection result on the corresponding mold 2. The display control device 10 is, for example, a laptop or desktop personal computer. The display control device 10 may be a smart phone carried by an operator or a tablet terminal carried by the operator.

The inspecting device 20 is a device that inspects the molds 2 on the conveyance path. The inspecting device 20 includes a sensor 21 that captures respective images of the plurality of the molds 2 which are conveyed along the conveyance path. The sensor 21 is, for example, a camera. The sensor 21 captures an image of a product surface (cavity surface) of a flaskless mold before a cope and a drag conveyed along the conveyance path are assembled.

The display control device 10 carries out an inspection of the molds for defects by comparing an image thus captured (hereinafter referred to as "captured image") with a reference image, and then accumulates an inspection result in an inspection result table. The cope and the drag are conveyed alternately to a core setting area.

Figure 2:
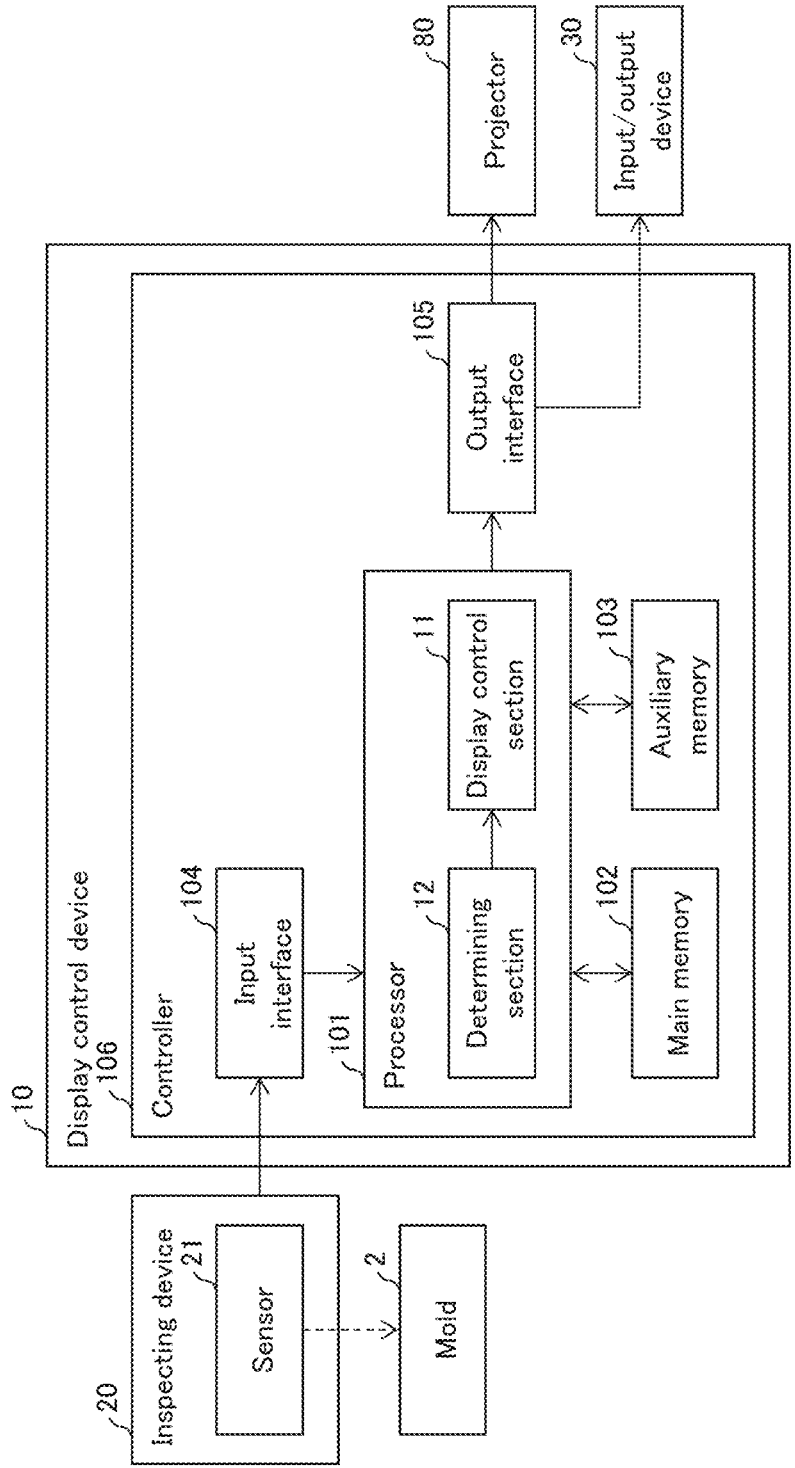
FIG. 2 is a block diagram schematically illustrating a configuration of a display control device 10 in accordance with Embodiment 1 of the present invention.

FIG. 2 is a block diagram schematically illustrating a configuration of the display control device 10. The display control device 10 includes a controller 106. The controller 106 includes a processor 101, a main memory 102, an auxiliary memory 103, an input interface 104, and an output interface 105. The processor 101 is a processor that controls the display control device 10, and is, for example, a processor such as a microprocessor, a digital signal processor, a microcontroller, or any combination of these processors. The main memory 102 and the auxiliary memory 103 (both of which are examples of a memory) are each, for example, a semiconductor random access memory (RAM). The main memory 102 and the auxiliary memory 103 may be an integral memory (physically one and the same memory) such that the main memory 102 and the auxiliary memory 103 are distinguished by region or by address in the same memory. The auxiliary memory 103 stores a program for causing the processor 101 to execute an operation of the display control device 10. The processor 101 causes a control program stored in the auxiliary memory 103 to be loaded in the main memory 102 and executes instructions contained in the loaded control program.

The main memory 102 mainly stores an application or software for mold drop evaluation. The auxiliary memory 103 stores reference image data to be referenced during inspection of the molds 2, an incoming captured image, display object data, and various other data. In the present embodiment, the auxiliary memory 103 stores a reference image table and the inspection result table. The reference image table is a table that stores, on a pattern by pattern basis, a reference image to be used when an inspection of the molds 2 is carried out. The inspection result table is a table that stores a result of a defect inspection of each of the molds 2 in association with identification information that identifies each of the molds 2.

The input interface 104 acquires the captured image from the inspecting device 20. The captured image thus acquired is stored in the auxiliary memory 103 in association with the identification information that identifies each of the molds 2. The output interface 105 outputs, to the input/output device 30 and/or the projector 80, data representing an image. Although one input interface 104 and one output interface 105 are illustrated in FIG. 2, the display control device 10 may include a plurality of input interfaces and/or a plurality of output interfaces. In this example, the processor 101 reads and executes the control program stored in the auxiliary memory 103, thereby realizing a display control section 11 and a determining section 12, which are illustrated in FIG. 2.

Figures 3, 4:
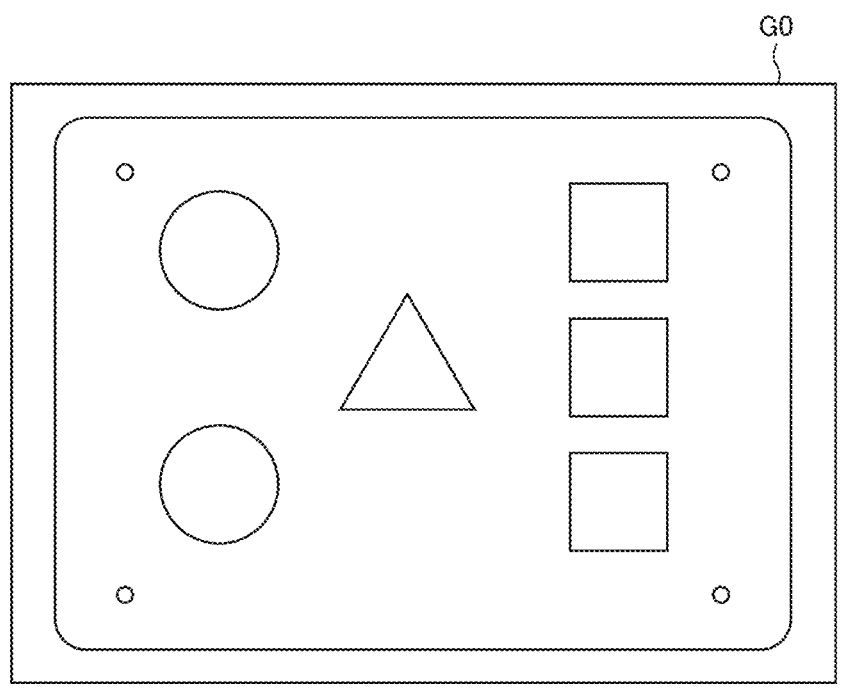
FIG. 3 is a diagram illustrating an example of contents of a reference image table in accordance with Embodiment 1 of the present invention.
FIG. 4 is a diagram illustrating an example of a reference image in accordance with Embodiment 1 of the present invention.

FIG. 3 is a diagram illustrating an example of contents of the reference image table. In the example illustrated in FIG. 3, the reference image table stores items of "pattern code" and "reference image folder No." in association with each other. Of these items, the item "pattern code" stores identification information (ID) that identifies a pattern. Pattern codes correspond to a certain pattern used for formation of molds, i.e. molds formed with use of that pattern. Among the pattern codes, for example, "10" is an ID of a drag formed by a certain pattern, and "11" is an ID of a cope to be assembled with the drag. In other words, the pattern codes distinguish a cope and a drag of a certain pattern. Therefore, when mold formation is carried out by use of the same pattern, IDs of molds flowing in the molding line consecutively alternate between the cope ID "11" and the drag ID "10" (see FIG. 5).

The item "reference image folder No." stores information indicative of a storage location of data of a reference image corresponding to that pattern. Note that the items contained in the reference image table are not limited to those described above, and other items may be contained in the reference image table. The reference image is an image obtained by capturing an image of a mold 2 formed without defects from above. By comparison between this reference image and the captured image, a check is made on the formed mold 2 for detects. In a case where a pattern code of a mold formed based on a certain pattern is "10" (drag), the display control device 10 determines the presence or absence of a defect by comparison between a reference image corresponding to "S10" as the "reference image folder No." and the captured image. Subsequently, since a mold 2 corresponding to a pattern code "11" (cope) is conveyed, the display control device 10 determines the presence or absence of a defect by comparison between a reference image stored in the reference image folder "S11" as "reference image folder No." and the captured image. The reference image table in FIG. 3 has a data structure for making a determination as to the presence or absence of a defect by such comparison between images.

FIG. 4 is a diagram illustrating an example of a reference image G0. The reference image G0 is prepared in advance and stored in the auxiliary memory 103. The reference image G0 is, for example, an image captured of a defect-free mold 2 by the inspecting device 20.

Figures 5, 6:
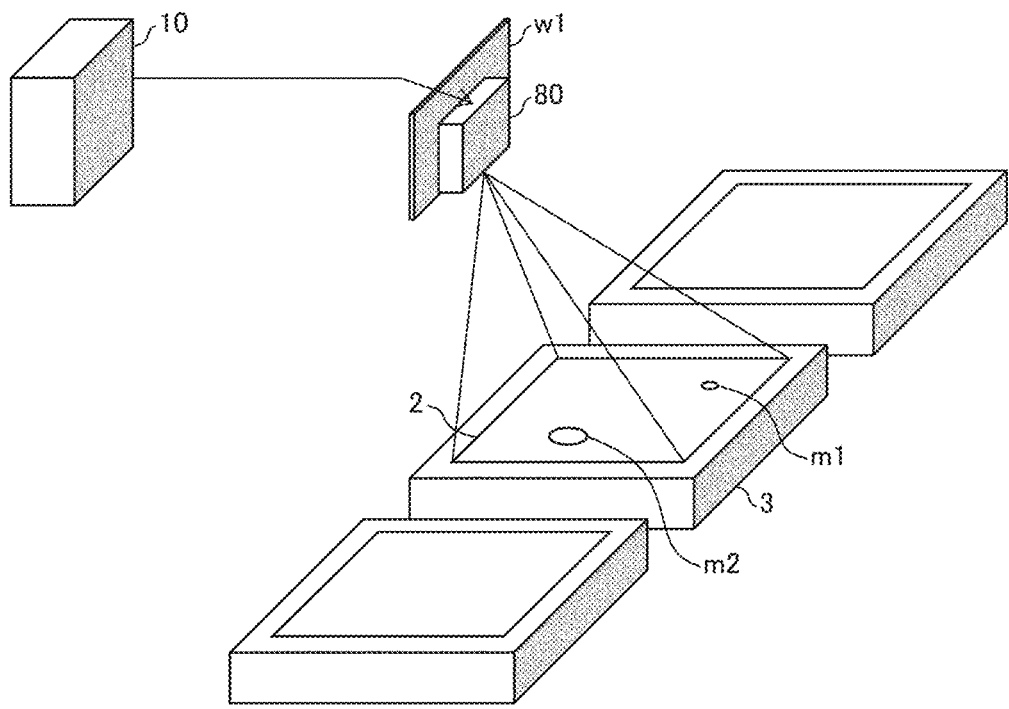
FIG. 5 is a diagram illustrating an example of contents of an inspection result table in accordance with Embodiment 1 of the present invention.
FIG. 6 is a view schematically illustrating a manner in which a marker image is projected onto a mold.

FIG. 5 is a diagram illustrating an example of contents of the inspection result table. In the example illustrated in FIG. 5, the inspection result table stores the items of "mold ID", "pattern code", "date and time of inspection", and "inspection result" in association with each other. Of these items, the item "mold ID" stores identification information that identifies a mold 2. IDs stored in the item "pattern code" are the same as the IDs stored in the "pattern code" in the reference image table described above. The item "date and time of inspection" stores information that indicates the date and time when a defect inspection was carried out. The item "inspection result" stores information that indicates a result of a defect inspection.

The item "inspection result" includes items of "evaluation" and "inspection result image folder No". The item "evaluation" stores information that indicates an evaluation result of a defect inspection. The evaluation of the defect inspection is carried out by comparison between a reference image and a captured image which are stored in the auxiliary memory 103, and is performed by the program of the display control device 10. As described above, the data table in FIG. 5 is stored in the auxiliary memory 103 of the display control device 10. The information indicating the evaluation result is, for example, "GOOD", "NO GOOD", or "FAIL". "GOOD" indicates that the mold 2 is normal. "NO GOOD" indicates that the mold 2 is abnormal (has a defect). "FAIL" indicates that the inspection itself failed. The item "inspection result image folder No." stores information that indicates a storage location of an image (hereinafter referred to as "inspection result image") representing the result of the defect inspection of the mold 2. As described above, the auxiliary memory 103 of the display control device 10 stores the result of the inspection of the mold 2 in association with the identification information that identifies the mold 2. Note that the items contained in the inspection result table are not limited to those described above, and other items may be contained in the inspection result table. For example, the inspection result may contain data representing a defect of a mold. The data representing a defect of the mold is data that represents at least one of, for example, a position of a defect, a shape thereof, and a size thereof.

Referring back to FIG. 2, the display control device 10 includes the display control section 11 and the determining section 12. The display control section 11 carries out a display process in which a marker indicating a defect of a mold determined by an inspection result, which is obtained by an inspection of molds, is optically displayed on the mold. The optical display is, for example, display of a marker image by the projector 80 or illumination of a laser beam by a laser light source.

The inspection of molds is carried out by comparison between a captured image obtained by the inspecting device 20 and a reference image stored in the auxiliary memory 103. The captured image is sequentially inputted to the input interface 104 and is stored in the auxiliary memory 103 by the processor 101. The display control section 11 compares the reference image stored in the auxiliary memory 103 with the captured image, thereby determining the size of a defect and generating a superimposed image according to the size of the defect. The superimposed image thus generated is displayed on the display 31. Such a program is stored in the auxiliary memory 103, and the processor 101 carries out a sequence of operations for image processing in accordance with the program stored in the auxiliary memory 103.

The determining section 12 carries out a determination process in which an inspection result, of a mold 2, to be displayed is determined from among inspection results which have been obtained by the inspection of a plurality of molds 2 conveyed along the conveyance path. The display control section 11 compares the captured image with the reference image, localizes a defective part according to a result of the comparison, determines a size of the defective part in relation to a threshold value, and determines an object to be superimposed on the image according to a result of the size determination. Further, the display control section 11 generates a composite image in which the determined object is superimposed on the captured image, and then temporarily stores, in the memory, the composite image thus generated (in a state of waiting to be read). The composite image waiting to be read is displayed on the display 31 by being triggered by the line controller 50 at a timing at which the composite image is to be displayed (specifically, at a timing at which a mold for which a corresponding image is to be displayed comes to the core work area).

According to the above configuration, a marker indicating a defect of a mold is optically displayed on the mold 2. This eliminates the need for an operator (for example, an operator who works to set cores) to separately check the inspection result of the mold to be worked via the display 31 or the like, and allows the operator to grasp a defect of the mold simply by looking at the mold to be worked.

Note that, although it is described in this embodiment that the inspecting device 20 and the display control device 10 are separate devices, the inspecting device 20 and the display control device 10 may be configured to be an integral device. That is, the inspecting device 20 may have a function related to the display control device 10. Further, the above-described display control device 10 may be realized by cooperation of a plurality of separate devices. For example, a first device including the display control section 11 and a second device including the determining section 12 may be configured to be separate devices.

Referring back to FIG. 1, the molding machine 40 is a device that produces molds 2. The molding machine 40 forms the cope and the drag alternately, and the conveying device 70 conveys the cope and the drag alternately. The molding machine 40 receives information on a mold 2 (hereinafter referred to as "mold information") from the line controller 50, and produces a mold 2 which is indicated by a pattern code included in the received mold information. The pattern code is information that uniquely represents a mold formation pattern. The molding machine 40 charges sand into a molding flask (not illustrated) which is set together with a pattern (not illustrated), and compacts the sand by pressing the sand in the molding flask. The molding machine 40 forms a mold 2 by removing the pattern from the compacted sand. Each time the molding machine 40 forms a mold 2, the molding machine 40 transmits mold feed information to the line controller 50. Each time the line controller 50 receives the mold feed information from the molding machine 40, the line controller 50 generates mold information, which will be described later, and registers the generated mold information in a mold management table.

The input/output device 30 is a device for an operator to carry out various operations. The input/output device 30 includes an operating section (not illustrated) which is operated by the operator and the display 31 on which the inspection result of the mold 2 is displayed. The input/output device 30 may include, in addition to the display 31, an input means or an input device. The input means or the input device is the one for allowing an operator who is present in the core setting area to provide an instruction as to whether or not to permit pouring. The operator who is present in the core setting area provides an instruction as to whether or not to permit pouring after the operator visually checks an imaging inspection result displayed on the display 31 and makes a judgment as to whether or not a defect is so severe that pouring should be stopped and whether a defect determined by an image evaluation is acceptable to an extent that pouring is permitted through the visual check and from the operator's experience. The input means is, for example, an OK/Cancel button, an OK/Cancel button displayed on a display or a touch panel, or the like. The input device is a device that inputs OK/Cancel by sound. In the example illustrated in FIG. 1, the input/output device 30 is installed in a core setting area A1.

The display 31 is, for example, a liquid crystal display, and shows a screen in accordance with data supplied from the display control device 10. The display 31 may be, for example, a display device installed in a core setting area of the mold 2, or may be, for example, a liquid crystal display which is included in a smartphone carried by the operator or in a tablet terminal carried by the operator. Alternatively, the display 31 may be a wearable computer such as a smart glass. Note that the display control device 10 may be configured to include the display 31.

The line controller 50 is a controller that carries out overall control of the casting system 1. In this embodiment, the line controller 50 controls, in particular, the molding machine 40, the pouring machine 60, and the conveying device 70. The position of a mold 2 flowing through the line is collectively managed by the line controller 50.

The pouring machine 60 is a device that pours molten metal into a mold 2. The pouring machine 60 pours molten metal (carries out pouring) into a mold 2, as a pouring target, located in the pouring area, in accordance with a control signal transmitted from the line controller 50. The pouring machine 60 determines whether or not pouring is permitted in accordance with a control signal received from the line controller 50. In a case where the pouring machine 60 determines that pouring is not permitted, the pouring machine 60 does not carry out pouring into the mold 2.

The conveying device 70 is a device that carries molds 2 from the molding machine 40 to the pouring machine 60. The conveying device 70 has, for example, a roller conveyor (not illustrated) or a rail (not illustrated) to sequentially convey a plurality of molds 2 along a conveyance path on the roller conveyor or the rail. The conveying device 70 carries each of the molds 2 in accordance with a control signal transmitted from the line controller 50.

The core setting area A1 is provided between the inspecting device 20 and the pouring machine 60. In the core setting area A1, an operator is present to set cores in molds 2.

Prior to the pouring, upper and lower flasks for the molds (the cope and the drag) having passed through the core setting area A1 are assembled by the mold assembly device 110 which assembles the upper and lower flasks. As a method of assembling the upper and lower flasks, for example, a method of lifting the upper flask, inverting the upper flask, and placing the upper flask on the lower flask is used.

The assembled upper and lower flasks are conveyed to the pouring area by the conveying device 70. When the assembled upper and lower flasks enter the pouring area, a determination as to whether or not pouring is permitted is made based on the mold management table (described later) in the line controller 50, prior to the pouring. In a case where either the cope or the drag is visually evaluated to be no good, the pouring machine 60 is controlled, based on the signal from the line controller 50, so as not to carry out pouring.

Note that although the case where the molding machine 40 alternately forms copes and drags has been described in the present embodiment, a method of forming molds is not limited to such a method. Alternatively, the molding machine 40 may be configured to form a cope and a drag at a time so that these two molds 2 are conveyed in groups of two (i.e., the cope and the drag are conveyed as a set). In this case, two molding machines 40 and two inspecting devices 20 are provided. Further, the conveying device 70 carries the molds 2 in groups of two.

In this case, the cope and the drag are subjected to image capture at once, the captured images of the cope and the drag are compared with two reference images at a time, and the results of the inspections of the cope and the drag are displayed on the display 31. An operator in charge of cores looks at these two images and the inspection result optically displayed on the mold 2 to judge whether or not to permit pouring.

The projector 80 is a device that projects an image onto a mold 2. In the example illustrated in FIG. 1, the projector 80 is installed in the core setting area A1, and projects a marker image indicating a defect of the mold 2 onto the mold 2 under control of the display control section 11.

FIG. 6 is a view schematically illustrating a manner in which the marker image is projected onto the mold 2 by the projector 80. In FIG. 6, the projector 80 is installed on an upper wall surface w1, which is provided in place in the core setting area A1, at a position where the projector 80 can project an image onto the mold 2 conveyed to the position P9. In the example illustrated in FIG. 6, the projector 80 projects, onto the mold 2 inside the molding flask 3 at the position P9, an image including marker images m1 and m2 which indicate defects of the mold 2.

The line controller 50 has the mold management table for managing mold information. The mold management table is stored in, for example, an auxiliary memory of the line controller 50. The mold information is information on a mold 2 and includes, for example, identification information that identifies the mold 2 and position information that indicates a position of the mold 2 on the conveyance path. That is, the mold management table stores the identification information of the mold 2 in association with the position information of the mold 2. FIG. 7 is a diagram illustrating an example of contents of the mold management table. The mold management table stores the mold information in which the items of, for example, "mold ID", "pattern code", "position", and "mold inspection result" are associated with each other. Of these items, the item "mold ID" stores identification information that identifies a mold 2. The item "pattern code" stores identification information that identifies a mold formation pattern which is used to produce a mold 2 identified by the corresponding mold ID.

The item "position" stores information indicating the position of the mold 2 identified by the corresponding mold ID on the conveyance path (hereinafter referred to as "position information"). In this embodiment, positions P1 to P19 are set as the position of the mold 2 on the conveyance path. This position information, P, is sequentially incremented in the order from P1 to P19 when one mold 2 is formed by the molding machine 40 and then conveyed by one. The position P1 is located most upstream in a conveyance direction of the conveying device 70 and is followed by the position P2, the position P3, and the like position information, which are assigned to positions downstream of the position P1. The position P1 is a position at which mold formation is carried out by the molding machine 40. The positions P2 to P4 are positions between the molding machine 40 and the inspecting device 20. The position P5 is a position at which image capture is carried out by the inspecting device 20. The positions P6 to P17 are positions between the inspecting device 20 and the pouring machine 60. The position P9 is a position at which cores are set. The position P18 is a position at which pouring of molten metal is carried out by the pouring machine 60. The position P19 is a position at which the molding flask containing the mold 2 into which the molten metal has been poured is taken out.

The conveying device 70 sequentially moves a plurality of molds 2 on the conveyance path, and outputs, each time the molds 2 are moved, a signal indicating that the movement is completed (hereinafter referred to as a "flask feed completion signal"). Each time a plurality of molds 2 are moved on the conveyance path, the line controller 50 updates the position information which is associated with the identification information of each of the molds 2. In this embodiment, each time the line controller 50 receives the flask feed completion signal from the conveying device 70, the "position information" included in the mold information, which is stored in the mold management table, is incremented by one, and new mold information is added to the mold management table. The position information indicating the position P1 is stored in "position" of the added mold information. Note that, when the molding flask at the position P19 is fed, it means that the molding flask will be taken out of the casting system 1.

That is, the line controller 50 generates new mold information when the mold 2 is formed. Further, when the mold 2 is ejected after the formation of the mold 2 is completed, the conveying device 70 moves one mold 2. Accordingly, all of the other molds 2 on the line are moved by one mold, and the position information (P1, P2, . . . , PN) of each of the molds 2 is incremented sequentially. The incremented position information is stored in the mold information table of the line controller 50. The line controller 50 keeps track of the locations of all of the molds 2 on the line from the position information stored in the mold management table.

The item "mold inspection result" includes items of "evaluation" and "pouring permission/non-permission". The item "evaluation" stores information that indicates an evaluation result of a defect inspection. The information stored in the item "evaluation" is the same as the information stored in the item "evaluation" in the inspection result table of the display control device 10.

The item "pouring permission/non-permission" stores information that indicates whether or not pouring is to be carried out (hereinafter referred to as "pouring permission/non-permission information"). In the present embodiment, an operator who sets cores makes a judgment as to whether or not to permit pouring into the mold 2, by visually checking an inspection result displayed on the display 31 or the inspection result optically displayed on the mold 2. To make a judgment as to whether or not to permit pouring into the mold 2, the operator assesses whether or not pouring into the mold 2 would cause a defect in a resulting casting, through visual check of the inspection result displayed on the display 31 or the inspection result optically displayed on the mold 2. The operator enters a result of the judgment by means of the input/output device 30. The input/output device 30 transmits the pouring permission/non-permission information to the line controller 50 in response to the operation of the operator. The line controller 50 causes the pouring permission/non-permission information received from the input/output device 30 to be stored in the item "pouring permission/non-permission" of the mold management table. The line controller 50 transmits a control signal to the pouring machine 60 in accordance with the information stored in the item "pouring permission/non-permission" of the mold management table. Note that the items contained in the mold management table are not limited to those described above, and other items may be contained in the mold management table.

(Operations)

Figure 8:
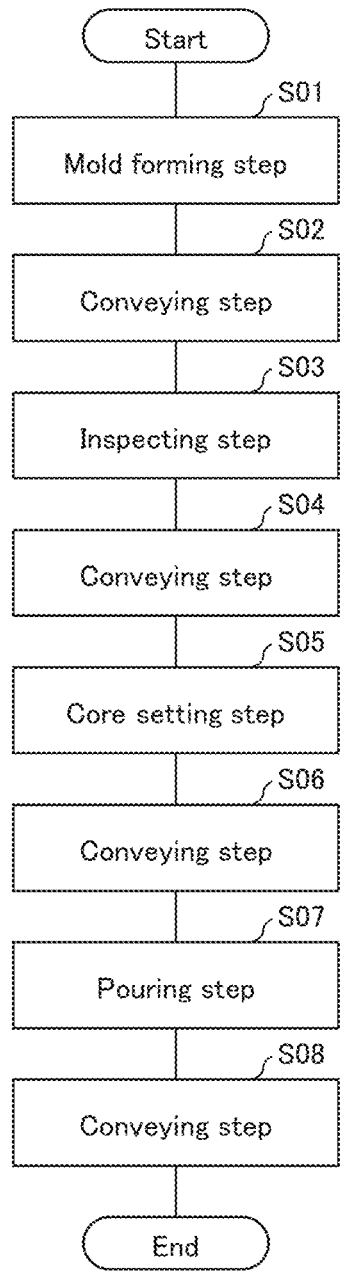
FIG. 8 is a process chart illustrating a production process of a casting in the casting system in accordance with Embodiment 1 of the present invention.

FIG. 8 is a process chart illustrating a production process of a casting in the casting system 1. In a mold forming step S01, the line controller 50 transmits a control signal instructing the molding machine 40 to form a mold and the mold information of the position P. The molding machine 40 produces a mold 2 of the type indicated by a pattern code which is included in the mold data received from the line controller 50.

In a conveying step S02, the line controller 50 transmits, to the conveying device 70, a control signal for instructing the conveying device 70 to convey molds 2 by one pitch (hereinafter referred to as "conveyance instruction signal"). Each time the conveying device 70 receives the conveyance instruction signal from the line controller 50, the conveying device 70 carries out control to convey the mold 2 on the conveyance path one pitch at a time. When the conveyance of the mold 2 is completed, the conveying device 70 transmits the flask feed completion signal to the line controller 50. Each time the line controller 50 receives the flask feed completion signal from the conveying device 70, the line controller 50 updates position information contained in the mold information of the molds 2 on the conveyance path. The molds 2 on the conveyance path are moved one pitch at a time by the conveying device 70. By repeating such a movement, the mold 2 located at the position of the molding machine 40 is moved to the position of the inspecting device 20.

In an inspecting step S03, the sensor 21 of the inspecting device 20 performs image capture (imaging) of the mold 2 formed in the molding flask and located in the inspection area (position P5). In the present embodiment, the sensor 21 captures an image of the mold 2 having been moved to the position P5 from above the mold 2. An image capture range of the sensor 21 is preset such that an image of at least a surface (entire upper surface) of the mold 2 located at the position P5 is captured. The display control device 10 performs an inspection of the mold 2 with use of the pattern code which is contained in the mold information of the mold 2 located at the position P5 and generated data of the captured image.

The inspection of the mold 2 is performed, for example, in a manner as described below. The display control device 10 carries out a process in which a defective part is identified by generating a subtraction image that represents a difference between the captured image captured by the sensor 21 and the pre-registered reference image, and subjecting the generated subtraction image to particle analysis to detect a mass (blob) within the subtraction image.

The display control device 10 causes an inspection result to be stored in the auxiliary memory 103 of the display control device 10. The inspection result includes, for example, data indicating the position of a defective part, data indicating the size of the defective part, image data representing the defective part, or a superimposed image data in which the image representing the defective part is superimposed on a reference image. By repeating the process in which storage into the auxiliary memory 103 is carried out, inspection results of a plurality of molds 2 are accumulated in the auxiliary memory 103.

In a conveying step S04, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold 2 located at the position of the inspecting device 20 is moved to the core setting area A1.

In a core setting step S05, the display control device outputs, to the projector 80, image data that represents a marker image indicating an inspection result of a mold 2 formed in the molding flask at the position P9. Further, the display control device 10 outputs, to the input/output device 30, image data representing a superimposed image in which an image representing a defect is superimposed on a reference image. The projector 80 optically displays a marker indicating the inspection result on the mold 2 by projecting, onto the mold 2, the marker image indicating the inspection result of the mold 2 in accordance with the image data obtained from the display control device 10. Further, the input/output device 30 causes the superimposed image obtained from the display control device 10 to be displayed on the display 31.

The projector 80 keeps projecting the marker image, which is the inspection result, onto the mold 2 while the mold 2 is stopped in the core setting area A1. Meanwhile, the input/output device 30 keeps displaying the superimposed image on the display 31 while the mold 2 is stopped in the core setting area A1. The operator in the core setting area A1 refers to the marker image projected onto the mold 2 or the superimposed image displayed on the display 31 to determine whether or not to set a core in the mold 2. For example, the operator performs the following operation: The operator sets the core in the mold 2 which has been determined to be normal based on the inspection result, but does not set the core in the mold 2 which has been determined to be abnormal based on the inspection result. In addition to such an operation for setting the core, the operator performs a pouring permission/non-permission manipulation in which pouring is permitted in a case where the operator has assessed the mold 2 to be normal by visual check, and is not permitted in a case where the operator has assessed the mold 2 to be abnormal by visual check.

In a conveying step S06, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold 2 in the core setting area A1 is moved to the position of the pouring machine 60.

In a pouring step S07, the line controller 50 transmits, to the pouring machine 60, a control signal for providing an instruction to carry out pouring and the mold information. The pouring machine 60 carries out pouring based on the pattern code contained in the mold information in accordance with the control signal received from the line controller 50. At this time, in a case where the mold 2 has been determined to be normal based on the inspection result, the line controller 50 transmits a control signal for instructing the pouring machine 60 to carry out pouring into the mold 2. On the other hand, in a case where the mold 2 has been determined to be abnormal based on the inspection result, the line controller 50 transmits a control signal for instructing the pouring machine 60 not to carry out pouring into the mold 2.

In a conveying step S08, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold having been subjected to pouring at the position of the pouring machine 60 is taken out of the casting system 1.

As described above, in the casting system 1, the molding machine 40 produces the mold 2, and the display control device 10 inspects the mold 2. Then, the core is set in the mold 2 having been determined to be normal based on the inspection result, and thereafter, the pouring machine 60 carries out pouring into the mold 2 with the core set therein. Further, in the casting system 1, a plurality of molds 2 are conveyed in order from the position P1 to the position P19 by the conveying device 70. That is, the molding step S01 for one mold 2, the inspecting step S03 for another mold 2, and the core setting step S05 for still another mold 2, and the pouring step S07 for yet another mold 2 are carried out in parallel.

Figure 9:
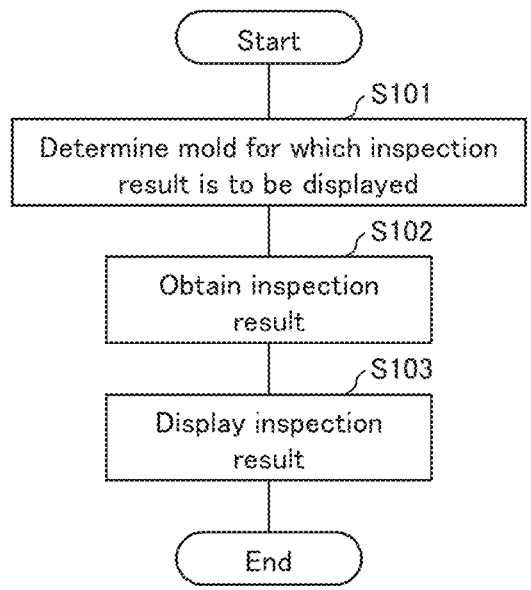
FIG. 9 is a flow chart illustrating an example of a flow of an inspection result projection process carried out by a display control device in accordance with Embodiment 1 of the present invention.

Next, a process in which an inspection result of a mold 2 is projected, which process is carried out by the display control device 10 and the line controller 50, will be described with reference to the drawing. FIG. 9 is a flow chart illustrating an example of a flow of an inspection result projection process carried out by the display control device 10 and the line controller 50. Note that some steps may be carried out in parallel or in a different order.

In the present embodiment, the identification information of the mold 2 in front of the operator in the core setting area A1 is grasped by the line control 50 because of its position in relation to the core setting area A1. The display control device 10 causes an image of the inspection result of the mold 2 in front of the operator in the core setting area A1 to be displayed on the display 31 in the core setting area A1 or projected by the projector 80. To do so, the line controller 50 transmits, to the display control device 10, the identification information of the mold 2 so that the display control device 10 reads the inspection image of the mold 2 in front of the operator in the core setting area A1.

In step S101, the line controller 50 determines the mold 2 for which the inspection result is to be displayed. As a method of determining the mold 2 for which the inspection result is to be displayed, for example, the line controller 50 determines a mold 2 located at a specific position to be the mold 2 for which the inspection result is to be displayed. The specific position is, for example, a position corresponding to the core setting area A1. The line controller 50 transmits, to the display control device 10, the identification information of the determined mold 2. The display control device 10 receives the identification information from the line controller 50. The determining section 12 of the display control device 10 determines the mold 2 corresponding to the received identification information to be the mold 2 for which the inspection result is to be displayed.

In step S102, the determining section 12 reads, from the auxiliary memory 103, the inspection result image of the determined mold 2, thereby obtaining the inspection result. The inspection result stored in the auxiliary memory 103 is an inspection result of each of a plurality of molds 2 conveyed along the conveyance path. In the present embodiment, the determining section 12 reads the inspection result image stored in the auxiliary memory 103 (object image of a mold drop part based on a difference between the captured image and the reference image) based on the identification information from the line controller 50.

In step S103, the display control section 11 causes the image data indicating the inspection result to be outputted to the projector 80, thereby causing the marker image indicating the defect of the mold 2, which defect is shown by the obtained inspection result, to be projected onto the mold 2. The marker image may be, for example, a rectangular frame or oval image surrounding a defective part of the mold 2 or an arrow image indicating the defective part of the mold 2. Further, the marker image may be an image in which a part different from the reference image is emphasized (for example, colored) in the captured image of the mold 2 which has been captured by the sensor 21. Further, the marker image may include an image of a character string describing the position of the defect of the mold 2 (a character string saying "mold drop is present in an upper right part", or the like).

Figure 10:
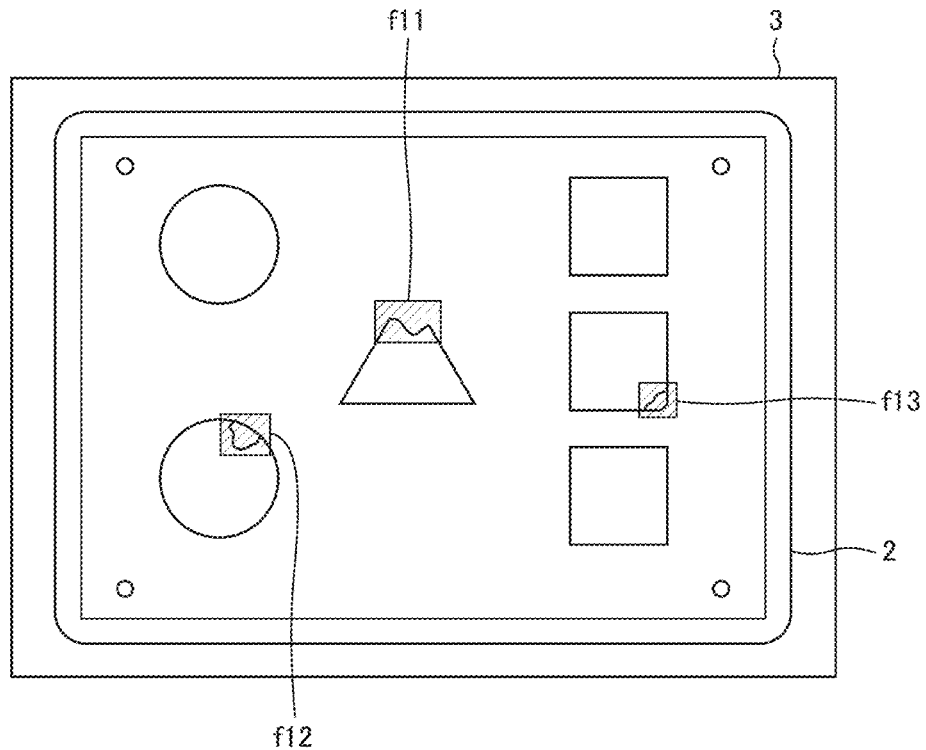
FIG. 10 is a view illustrating an example of a marker image projected onto a mold.

FIG. 10 is a view illustrating an example of a marker image projected onto a mold 2. In the example illustrated in FIG. 10, rectangular images f11 to f13 are projected onto the mold 2 inside the molding flask 3 in regions corresponding to the detected defects. That is, in this embodiment, the display control section 11 controls the projector 80 to project the marker image onto the mold 2 at a position corresponding to the defect of the mold 2. Furthermore, in the example illustrated in FIG. 10, projecting a rectangular figure of a size equivalent to the size of the part where the defect has been detected indicates at which position the defect has been detected and how large the detected defect is. The color of the mold 2 is, for example, black, white, or cream. The color of the marker image is, for example, bluish white. Note that the colors of the mold 2 and the marker image are not limited to these colors and may be other colors.

Incidentally, in the image-based mold drop evaluation made on a good/no good basis by the inspecting device 20, even a part which does not need to be regarded as no good (mold drop) (e.g., a part, called sprue runner, which will be separated from a casting product) may be regarded as no good, depending on the shape of the mold 2. In a case where such a negative evaluation result (no good) is taken over as is and pouring is not permitted, the yield in the entire line is reduced.

Conversely, relatively small defects of a mold which is regarded as good in the image-based mold drop evaluation made by the inspecting device 20 include an unacceptable defect that may cause a product failure of an actual casting product. In a case where a casting is produced by carrying out pouring into such a mold, a defective rate increases, and the yield in the entire line is reduced.

Therefore, a determination as to whether to carry out pouring into that mold needs to be made not only by image-based mechanical evaluation but also by final evaluation made by the operator through a visual check with reference to information on the image-based evaluation.

The operator in the casting line is basically present only in the core setting area A1 or around the pouring machine 60. In a current casting line, it is the operator in the core setting area A1 that can visually check a mold drop.

Meanwhile, the inspecting device 20 for making the image-based mold drop evaluation carries out image capture at a position slightly short of the core setting area A1, and then makes an evaluation on a good/no good basis. Thus, to display and present, to the operator in the core setting area A1, an image representing a result of evaluation (evaluation result) of a target mold 2 which is located in front of the operator, the image representing the evaluation result, which has been stored in advance, of the target mold 2 is retrieved from the inspection result table of the display control device 10 and is displayed on the display 31 at the point in time when the target mold 2 arrives at the core setting area A1, in response to the position control signal from the line controller 50.

While viewing the image displayed on the display 31, the operator in the core setting area A1 makes a visual check on an image of the target mold in front of the operator, particularly a part indicated as a mold drop (no good), and evaluates whether or not the no-good result of the image-based evaluation is taken over as is and whether pouring into the target mold would not cause any problem. The operator enters a result (good or no good) of the evaluation that he/she made by means of the operating section of the input/output device 30.

The operator's entry of the visual evaluation result may be made via two simple two buttons, via keys of a personal computer, or by voice input, or various input means known in the art can be employed. The operator in the core setting area A1 cannot spare much time for the entry of the result of the visual mold drop evaluation since the operator not only sets cores but also carries out various kinds of operations prior to the mold assembly. For this reason, it is preferable to be able to easily enter the visual evaluation result.

The visual evaluation result (good or no good) having been entered by the operator is transmitted to the line controller 50 and stored as the visual evaluation result in the mold management table.

Figure 11:
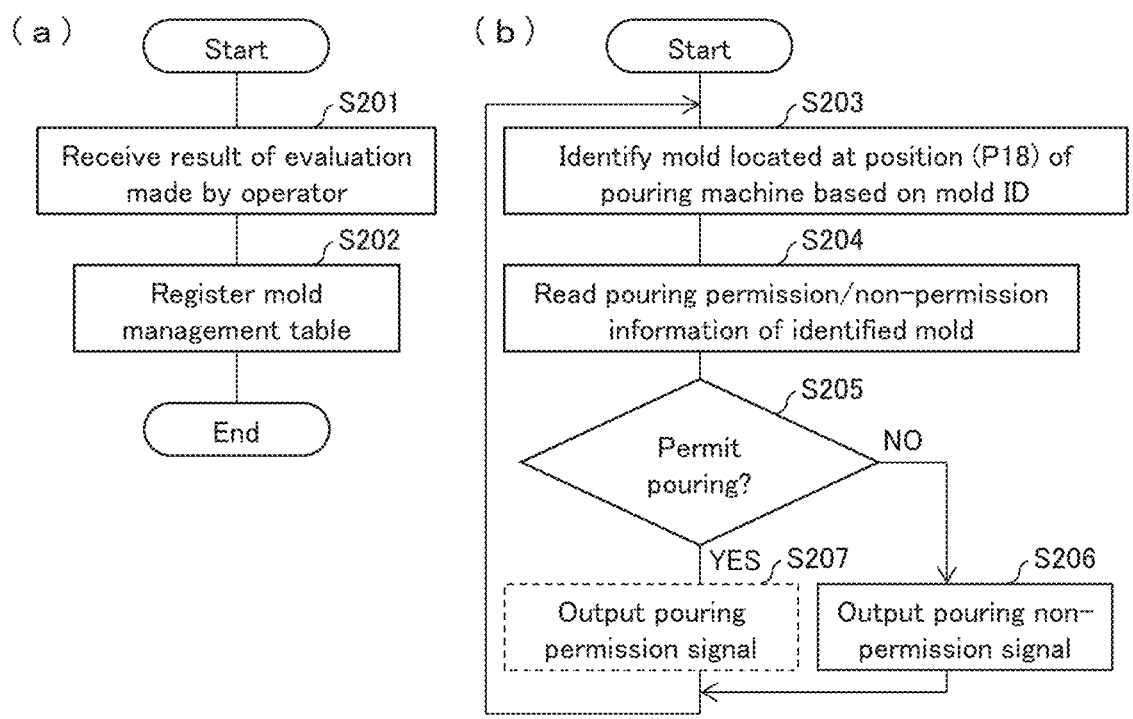
FIG. 11 is a flowchart illustrating an example of a flow of a process carried out by the line controller in accordance with Embodiment 1 of the present invention.

(a) of FIG. 11 illustrates a flowchart of a process of updating the mold management table in the line controller 50. Note that some steps may be carried out in parallel or in a different order.

In step S201, the line controller 50 receives, from the input/output device 30, information indicating a result (evaluation result) of evaluation made by the operator.

In step S202, the line controller 50 registers the received evaluation result in the mold management table.

As described above, when the evaluation result obtained by visual check by the operator who is present in the core setting area is updated by the line controller 50, the pouring permission/non-permission information for each mold is registered in the mold management table, as illustrated in FIG. 7.

Next, pouring control by the line controller 50 based on the mold management table in which the pouring permission/non-permission information has been updated and registered as described above will be described with reference to (b) of FIG. 11.

(b) of FIG. 11 is a flowchart illustrating pouring control over the pouring machine 60 by the line controller 50. Note that some steps may be carried out in parallel or in a different order.

In step S203, the line controller 50 identifies a mold 2 having arrived at the pouring machine 60 based on the mold ID.

In step S204, a pouring permission/non-permission signal for the mold 2 having arrived at the pouring machine 60 is read based on the mold ID, wherein the pouring permission/non-permission signal indicates whether or not to permit pouring into the mold.

In step S205, in a case where the pouring permission/non-permission signal indicates "pouring non-permission", the line controller 50 outputs a pouring non-permission signal to the pouring machine 60 (step S206). Upon receiving this "pouring non-permission" signal, the pouring machine 60 proceeds with the process without carrying out pouring into that mold.

On the other hand, in step S205, in a case where the pouring permission/non-permission signal indicates "pouring permission", the line controller 50 outputs a pouring permission signal to the pouring machine 60 (step S207). Note that, depending on the circumstances, the line controller 50 does not have to output a "pouring permission" signal to the pouring machine 60. This is realized by controlling the pouring machine 60 such that the pouring machine 60 carries out pouring into all of the molds having arrived at the pouring machine 60 unless the pouring machine 60 receives the "pouring non-permission" signal from the line controller 50, since the pouring machine 60 basically operates such that the pouring machine 60 ordinarily carries out pouring into all of the molds having arrived at the pouring machine 60.

In this way, the pouring machine 60 carries out pouring control over the mold 2 having arrived at the position of the pouring machine 60 based on the pouring permission/non-permission signal having been received from the line controller 50. In a case where the received pouring permission/non-permission signal indicates "permission" or where the pouring machine 60 receives no signal, the pouring machine 60 carries out pouring into the mold 2. On the other hand, in a case where the received pouring permission/non-permission signal indicates "non-permission", the pouring machine 60 does not carry out pouring into the mold 2.

In the present embodiment, onto the mold 2 conveyed along the conveyance path, the marker image indicating the inspection result of the mold 2 is projected. Thus, an operator who is present near the mold 2 (for example, the operator who works to set cores) can grasp the inspection result of the mold 2 to be worked only by visually checking the mold 2. That is, the operator does not need to check the inspection result of the mold 2 to be worked via a display or the like separately provided. This reduces a time required to grasp the inspection result of the mold 2 to be worked.

In Embodiment 1, the display control device 10 is configured as a device separate from the line controller 50. Alternatively, the line controller 50 may have the function of the display control device 10. That is, the line controller 50 and the display control device 10 may be configured as an integral device.

Further, In Embodiment 1, the configuration in which the mold management table is stored in the auxiliary memory of the line controller 50 has been described. Alternatively, the mold management table may be stored in the auxiliary memory 103 of the display control device 10 or may be stored in another device. In Embodiment 2, the configuration in which the inspection result of the mold 2 is stored in the auxiliary memory 103 of the display control device 10 has been described. Alternatively, the inspection result of the mold 2 may be stored in another device without being stored in the display control device 10.

Embodiment 2

Another embodiment of the present invention is described below. This embodiment differs from Embodiment 1 described above in that the process in which an inspection result of a mold 2 is displayed (process in step S103 in FIG. 9), carried out by the display control device 10, is carried out in a different way. Note that, for convenience of explanation, members having functions identical to those of the respective members described in the above embodiment are given respective identical reference signs, and a description of those members is omitted here.

Figure 12:
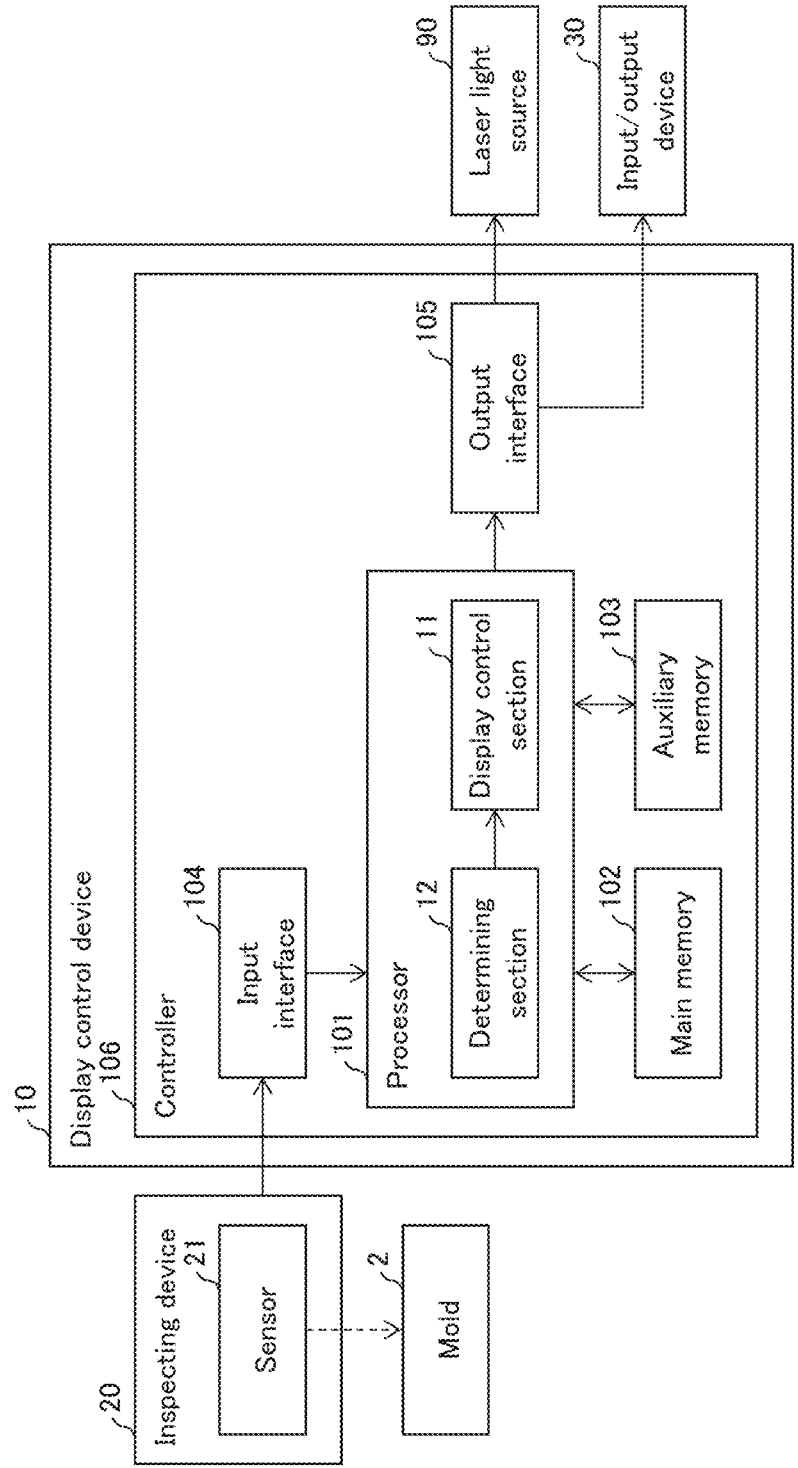
FIG. 12 is a block diagram schematically illustrating a configuration of a display control device 10B in accordance with Embodiment 2 of the present invention.

FIG. 12 is a block diagram schematically illustrating a configuration of a display control device 10B in accordance with Embodiment 2. In Embodiment 1 described above, the display control section 11 of the display control device 10 controls the projector 80 to project, onto the mold 2, the marker image indicating the defect of the mold. On the other hand, in this embodiment, the display control section 11 controls a laser light source 90 to illuminate a laser beam on the mold 2 so that a marker is optically displayed on the mold 2.

In this example, the display control section 11 controls the laser light source 90 to illuminate a laser beam on the mold 2 at a position corresponding to the defective part of the mold 2. More specifically, the display control section 11 switches between illumination directions of a laser beam at intervals of a predetermined unit time to change the illumination positions on the mold 2 at intervals of a unit time. By repeating the switching process, the display control section 11 causes the figure surrounding the defective part of the mold 2 to be formed on the mold 2 by the laser beam.

Figure 13:
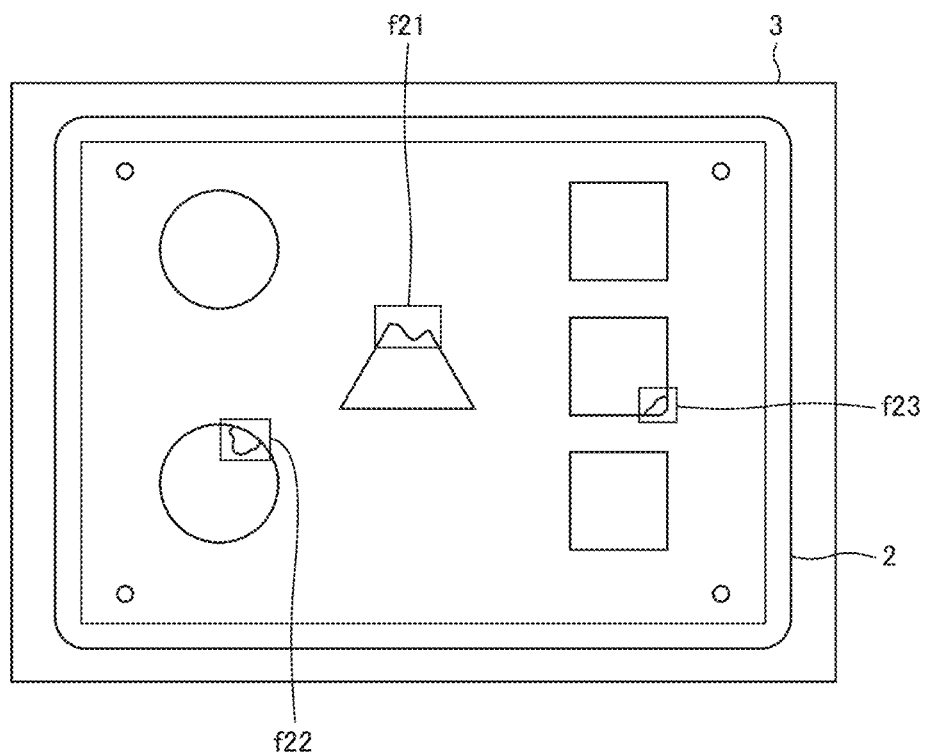
FIG. 13 is a view illustrating an example of a laser beam which is illuminated on a mold 2.

FIG. 13 is a view illustrating an example of a laser beam which is illuminated on a mold 2. In the example illustrated in FIG. 13, in the mold 2, figures f21 to f23 surrounding detected defective parts are formed. Furthermore, in the example illustrated in FIG. 13, a rectangular figure (marker image) of a size equivalent to the size of the part where the defect has been detected is formed by a laser beam. This indicates at which position the defect has been detected and how large the detected defect is. The color of the mold 2 is, for example, black, white, or cream. The color of the marker image is, for example, bluish white. Note that the colors of the mold 2 and the marker image are not limited to these colors and may be other colors.

In this embodiment, the display control section 11 may change an illumination form of the laser beam according to a form of the defect. The form of the defect is, for example, a position, shape, or size of the defect. The illumination form of the laser beam is, for example, an illumination position, illumination direction, intensity, color, or blinking pattern of the laser beam. For example, the display control section 11 may change the color or intensity of the laser beam according to the size of the defect.

Further, in this embodiment, the display control section 11 may control a plurality of laser light sources to control illumination of the laser beam onto the mold 2. For example, the display control section 11 controls a plurality of laser light sources which emit laser beams of respectively different colors so that the color of the laser beam to be illuminated on the mold 2 is changed according to the size of the defect.

Embodiment 3

Figure 14:
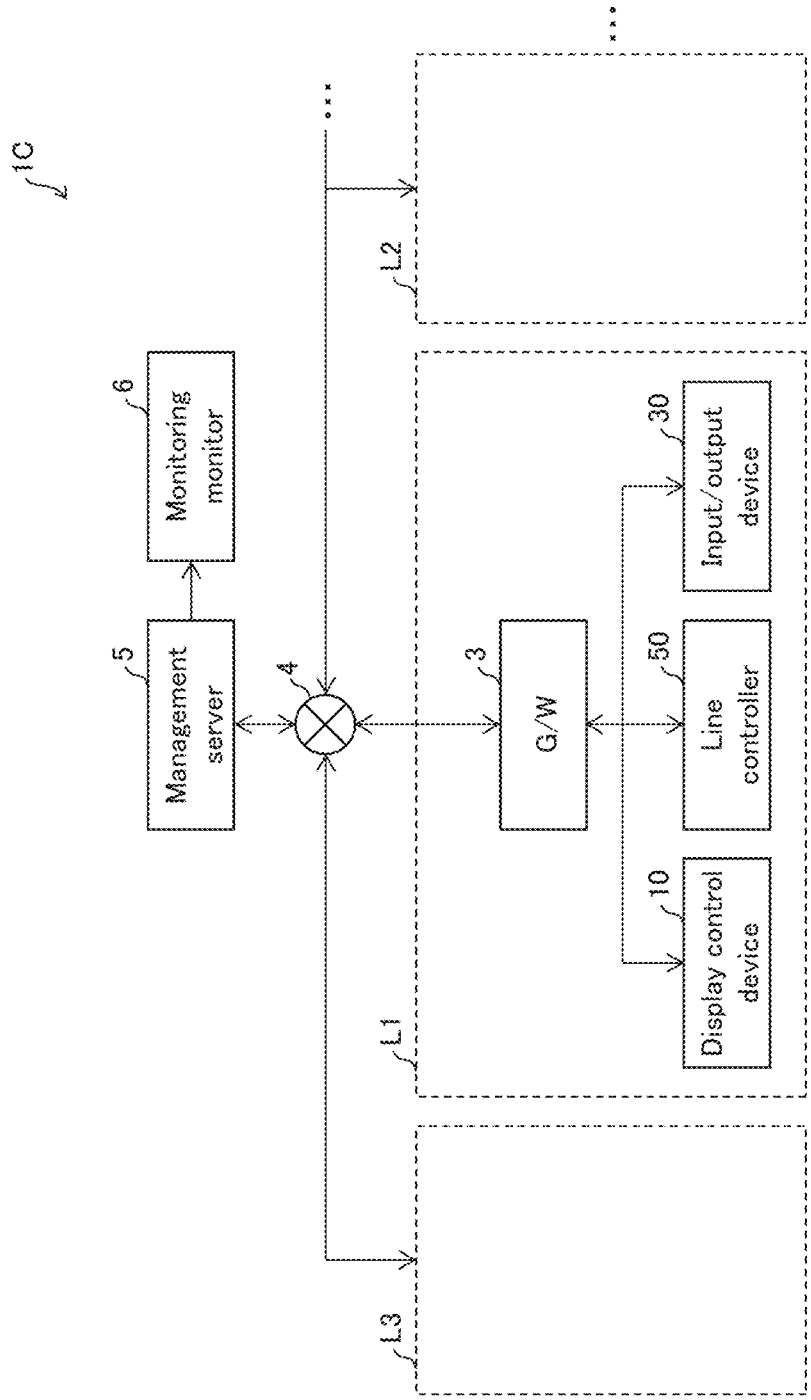
FIG. 14 is a diagram schematically illustrating a configuration of a casting system in accordance with Embodiment 3 of the present invention.

FIG. 14 is a diagram schematically illustrating a configuration of a molding system 1C in accordance with the present embodiment. In an example illustrated in FIG. 14, a plurality of casting lines L1, L2, L3, . . . are provided together in one factory. Each of the casting lines L1, L2, L3, . . . includes the casting system 1 illustrated in FIG. 2. Particularly, each of the casting lines L1, L2, L3, . . . includes a display control device 10, an input/output device 30, a line controller 50, and a gateway GW. The display control device 10, the input/output device 30, and the line controller 50 are similar to those in Embodiment 1 described above.

Data stored in the display control device 10, data stored in the line controller 50, data stored in the input/output device 30 are integrated, organized, and managed in the management server 5 of the factory through the gateway GW and the network 4.

A state of the integrated and managed data in the management server 5 is displayed as traceability data including current data or past data on a monitoring monitor 6 of, for example, a personal computer (PC) for factory management or a mobile terminal for factory management. The data displayed on the monitoring monitor 6 include operating statuses of the individual lines, occurrence status of mold drops (a failure rate, etc.), analyzed failure causes, advice on measures, and others. For example, in addition to a total failure rate in each of the lines in the factory, the presence or absence of mold drops, and when a mold drop has occurred in which of the lines are graphically displayed.

As for information indicative of the occurrence of a mold drop, other information on the mold 2 are also displayed, including, for example, external information such as sand property data on the mold 2, control data during mold formation, mold strength determination result data, an ambient temperature, and a temperature, and an actual inspection result image.

The traceability data can be used, for example, to display a past failure rate and a failure incidence rate of mold drops in a total number of failures and to provide advice on measures.

Embodiment 4

Figure 15:
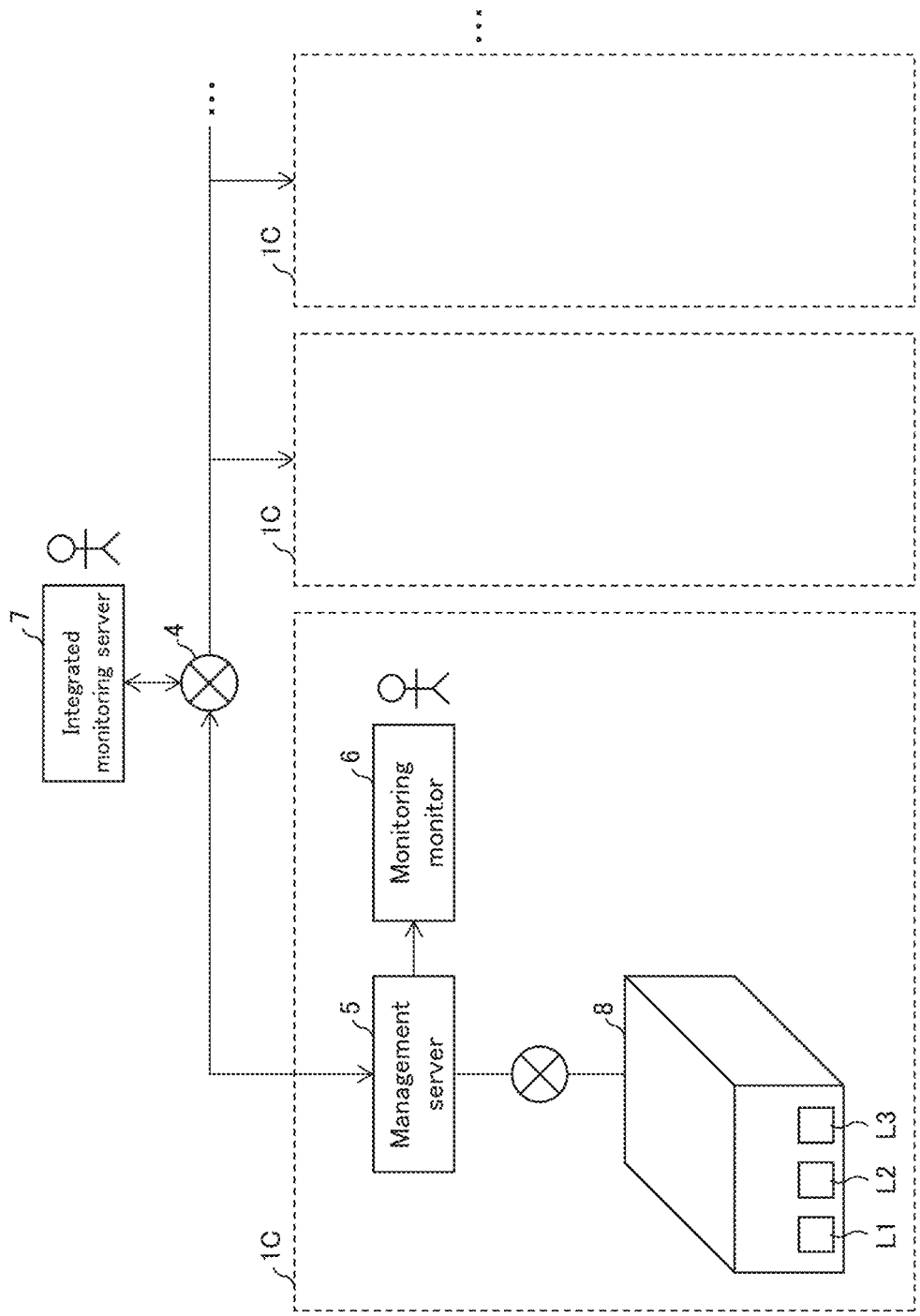
FIG. 15 is a diagram schematically illustrating a configuration of a casting system in accordance with Embodiment 4 of the present invention.

FIG. 15 is a diagram schematically illustrating a casting system 1D in accordance with the present embodiment. The casting system 1D includes a plurality of casting systems 1C each including a plurality of casting lines in one factory 8. In each of the casting systems 1C, management is carried out for each casting line. The casting systems 1C include their respective management servers 5 which are connected to an integrated monitoring server 7 via a network 4. The integrated monitoring server 7 receives data from the plurality of management servers 5 and organizes and manages the data.

The present embodiment enables monitoring of a plurality of factories each including a plurality of lines. In this case, the management of the individual factories is similar to that in Embodiment 3 described above.

In the management of multiple factories, various data organized and stored in the integrated monitoring server 7 in each factory are collected in the management server 5 of each factory 8 via the network 4. The various data thus collected are organized and stored so that a failure rate and occurrence status of mold drops can be monitored, for example, through the screen in each factory 8, as in Embodiment 3.

[Variations]

In Embodiment described above, the display control section 11 may change the projection direction of the marker image (or the illumination direction of the laser beam) so as to follow the position of the mold 2 conveyed from the conveying device 70. In this case, the display control section 11 obtains, from the line controller 50, information on the position of the mold 2 and then controls the projection direction (or the illumination direction) in accordance with the obtained information. The information on the position is, for example, information indicative of a relative position of the mold 2 with respect to the projector 80, information indicative of an absolute position of the mold 2, and a conveyance rate of the mold 2 conveyed by the conveying device 70. According to this aspect, even in a case where the mold 2 moves, the marker is optically displayed on the mold 2 so as to follow the position of the mold 2. This allows the operator for the mold 2 to grasp the inspection result of the mold 2 to be worked only by visually checking the mold 2.

In each of the embodiments described above, the configuration used in a case where the inspection result of the mold 2 is optically displayed on the mold 2 has been described. The display control device in accordance with the present invention can also be applied to a system other than the systems presented in the above-described embodiments. For example, the display control device in accordance with the present invention may be configured such that an inspection result obtained by an inspection of a casting produced with use of a mold for detects is optically displayed on the casting.

In Embodiment 1 described above, the display control device 10 carries out control to cause an inspection result of a mold 2 to be displayed on the display 31. The casting system 1 may be configured so as not to include the display 31. In this case, the operator grasps the inspection result of the mold 2 by visually checking the inspection result optically displayed on the mold 2.

The functions implemented by the display control device 10 in the above-described embodiments may be shared and implemented by a plurality of devices. For example, at least part of the functions of the display control device 10 in accordance with Embodiment 1 described above may be implemented on a server in the cloud. In this case, the display control device 10 in accordance with Embodiment 1 described above is realized by communications between the display control device 10 and the server via a network.

In this case, to serve as a mold drop detecting deice, the server not only has the function of arithmetic operation and the function of image data storage, but also analyzes a link between a mold drop and data on sand properties and data during mold formation to prevent the occurrence of a mold drop and provides advice on measures or the like.

The server accumulates, for example, data relating to the inspection of a mold 2 and analysis data obtained from the devices on the lines. The data relating to the inspection of a mold 2 is, for example, an image captured by the inspecting device 20 and a reference image used for the inspection, a composite image in which a mold drop part is marked on an inspection result image, and parameters relating to the inspection process. The analysis data are, for example, sand properties before mold formation (CB, moisture, sand temperature, compressive strength, air permeability, etc.), control data during the mold formation (aeration waveform, squeeze pressure waveform, application quantity of a mold release agent, etc.), measured data of the mold strength after the mold formation, and environmental data of the factory (ambient temperature, humidity, etc.). The analysis data on the line is stored in association with inspection data.

Functions provided by the server are, for example, tracking of past failure occurrences (visualization by year, by month, by day or by product, etc.), and prediction of a failure rate and provision of advice on measures based on past accumulated data.

[Example of Configuration Achieved by Software]

Control blocks of the display control device 10, the inspecting device 20, the input/output device 30, and the line controller 50 (particularly, the display control section 11 and the determining section 12) can be realized by a logic circuit (hardware) provided in an integrated circuit (IC chip) or the like. Alternatively, control blocks of the display control device 10, the inspecting device 20, the input/output device 30, and the line controller 50 can be realized by software.

In the latter case, the display control device 10, the inspecting device 20, the input/output device 30, and/or the line controller 50 each includes a computer that executes instructions of a program that is software realizing the foregoing functions. The computer includes, for example, at least one processor. The computer also includes at least one computer-readable storage medium in which the program is stored. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a RAM or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

REMARKS

The present invention is not limited to the embodiments, but can be altered within the scope of the claims. The present invention also encompasses, in its technical scope, any embodiment derived by combining technical means included in differing embodiments.

Aspects of the present invention can also be expressed as follows:

In order to solve the above-described problem, a display control device in accordance with Aspect 1 of the present invention includes a controller, the controller configured to carry out a display process in which a marker indicating a defect of a mold determined by an inspection result, which is obtained by an inspection of molds, is optically displayed on the mold.

With the above configuration, a marker indicating a defect of a mold is optically displayed on the mold. This eliminates the need for an operator to separately check the inspection result of the mold to be worked via the display or the like, and allows the operator to grasp a defect of the mold simply by looking at the mold to be worked.

In Aspect 1 of the present invention, a display control device in accordance with Aspect 2 of the present invention may be arranged such that in the display process, the controller controls a projector to project a marker image indicating the defect of the mold onto the mold.

With the above configuration, a marker image indicating a defect of a mold is projected onto the mold. This eliminates the need for an operator to separately check the inspection result of the mold to be worked via the display or the like, and allows the operator to grasp the inspection result of the mold simply by looking at the mold to be worked.

In Aspect 2 of the present invention, a display control device in accordance with Aspect 3 of the present invention may be arranged such that in the display process, the controller causes the marker image to be projected onto the mold at a position corresponding to the defect of the mold.

With the above configuration, a marker image indicating a defect of a mold is projected onto the mold at a position corresponding to the defect of the mold. This eliminates the need for an operator to separately check the inspection result of the mold to be worked via the display or the like, and allows the operator to grasp the position of the defect of the mold simply by looking at the mold to be worked.

In Aspect 1 of the present invention, a display control device in accordance with Aspect 4 of the present invention may be arranged such that in the display process, the controller controls a laser light source to illuminate a laser beam on the mold.

With the above configuration, a defect of a mold is optically displayed on the mold by a laser beam illuminated on the mold. This eliminates the need for an operator to separately check the inspection result of the mold to be worked via the display or the like, and allows the operator to grasp a defect of the mold simply by looking at the mold to be worked.

In Aspect 4 of the present invention, a display control device in accordance with Aspect 5 of the present invention may be arranged such that in the display process, the controller causes the laser beam to be illuminated on the mold at a position corresponding to the defect of the mold.

With the above configuration, a laser beam is projected at a position corresponding to a defect of a mold. This eliminates the need for an operator to separately check the inspection result of the mold to be worked via the display or the like, and allows the operator to grasp the position of the defect of the mold simply by looking at the mold to be worked.

In Aspect 4 or 5 of the present invention, a display control device in accordance with Aspect 6 of the present invention may be arranged such that in the display process, the controller changes an illumination form of the laser beam according to a form of the defect.

With the above configuration, a laser beam is illuminated on a mold in an illumination form which is determined according to a form of a defect of the mold shown by an inspection result. This eliminates the need for an operator to separately check the inspection result of the mold to be worked via the display or the like, and allows the operator to grasp the form of the defect of the mold simply by looking at the mold to be worked.

In Aspects 1 to 6 of the present invention, a display control device in accordance with Aspect 7 of the present invention may be arranged such that the controller is configured to further carry out a determination process in which a mold for which the inspection result is to be displayed is determined from among a plurality of the molds conveyed along the conveyance path, and in the display process, the controller causes the marker indicating the defect of the mold shown by the inspection result, which is obtained by the inspection of the molds, determined in the determination process to be optically displayed on the mold corresponding to the inspection result among the plurality of the molds conveyed along the conveyance path.

With the above configuration, a marker indicating a defect of a mold is optically displayed on the mold conveyed along the conveyance path. This eliminates the need for an operator to separately check the inspection result of the mold being conveyed via the display or the like, and allows the operator to grasp the defect of the mold simply by visually checking the mold being conveyed.

In Aspects 1 to 7 of the present invention, a display control device in accordance with Aspect 8 of the present invention may be arranged such that the controller includes: at least one processor configured to carry out each of the foregoing processes in accordance with a predetermined program; and at least one memory storing the program.

With the above configuration, a marker indicating a defect of a mold is optically displayed on the mold. This eliminates the need for an operator to separately check the inspection result of the mold to be worked via the display or the like, and allows the operator to grasp a defect of the mold simply by looking at the mold to be worked.

A computer-readable non-transitory storage medium in accordance with Aspect 9 of the present invention stores a control program for controlling the display control device described in Aspect 1, the control program causing the controller to carry out each of the foregoing processes.

The present invention also encompasses a control program for controlling the display control device described in Aspect 1 and a computer-readable non-transitory storage medium in which the control program is stored.

REFERENCE SIGNS LIST 1 casting system
2 mold
3 molding flask
10, 10B display control device
11 display control section
12 determining section
20 inspecting device
21 sensor
30 input/output device
40 molding machine
50 line controller
60 pouring machine
70 conveying device
80 projector
90 laser light source
101 processor
102 main memory
103 auxiliary memory
104 input interface
105 output interface
A1 core setting area
f11 to f13 rectangular image
f21 to f23 FIGS.
m1 to m2 marker image
P1 to P19 position
w1 wall surface

The invention claimed is:

1. A display control device comprising:
a controller, the controller being configured to carry out
a display process in which a marker indicating a defect of a mold determined by an inspection result, which is obtained by an inspection of a plurality of molds, is optically displayed on the mold,
a determination process in which a mold for which the inspection result is to be displayed is determined from among the plurality of molds conveyed along a conveyance path, and wherein
in the display process, the controller is configured to cause marker indicating the defect of the mold to be optically displayed on the mold corresponding to the inspection result from among the plurality of molds conveyed along the conveyance path.

2. The display control device according to claim 1, wherein
in the display process, the controller is configured to control a projector configured to project a marker image indicating the defect of the mold onto the mold.

3. The display control device according to claim 2, wherein
in the display process, the controller is configured to cause the marker image to be projected onto the mold at a position corresponding to the defect of the mold.

4. The display control device according to claim 1, wherein
in the display process, the controller is configured to control a laser light source to illuminate a laser beam on the mold.

5. The display control device according to claim 4, wherein
in the display process, the controller is configured to cause the laser beam to be illuminated on the mold at a position corresponding to the defect of the mold.

6. The display control device according to claim 4, wherein
in the display process, the controller is configured to change an illumination form of the laser beam according to a form of the defect.

7. The display control device according to claim 1, wherein the controller includes
at least one processor configured to carry out the determination process and the display process in accordance with a program; and
at least one memory storing the program.

8. A computer-readable non-transitory storage medium storing a control program for controlling the display control device recited in claim 1, the control program causing the controller to carry out the determination process and the display process.

* * * * *